United States Patent [19]

Marshall

[11] Patent Number: 4,521,027
[45] Date of Patent: Jun. 4, 1985

[54] DOUBLE FLANGE SEALING MEMBER FOR SINGLE ACTION PISTON PUMP

[75] Inventor: Charles R. Marshall, Warwick, R.I.

[73] Assignee: Dixon Industries Corporation, Bristol, R.I.

[21] Appl. No.: 611,211

[22] Filed: May 17, 1984

[51] Int. Cl.³ .............................................. F16J 15/32
[52] U.S. Cl. ................................... 277/152; 277/174; 92/243
[58] Field of Search ..................... 277/12, 32, 73, 152, 277/153, 174, 175; 92/242–245

[56] References Cited

U.S. PATENT DOCUMENTS

| | | |
|---|---|---|
| 174,280 | 2/1976 | Mooney . |
| 2,274,304 | 2/1942 | Perry . |
| 2,294,331 | 8/1942 | Douglas et al. . |
| 2,309,446 | 1/1943 | Ekkebus ............................ 92/243 X |
| 2,310,917 | 2/1943 | Daly ..................................... 92/243 |
| 2,396,386 | 3/1946 | Price . |
| 2,684,632 | 7/1954 | Horton . |
| 2,859,078 | 11/1958 | Jacobs . |
| 3,023,062 | 2/1962 | Waldrop . |
| 3,136,228 | 6/1964 | Dailey . |
| 3,303,757 | 2/1967 | Ward . |
| 3,362,719 | 1/1968 | McCormick .................... 277/153 X |
| 3,391,645 | 7/1968 | Koza . |
| 3,464,323 | 9/1969 | Saksun . |
| 3,487,897 | 1/1970 | Hahm et al. . |
| 3,563,557 | 2/1971 | Doutt . |
| 3,605,553 | 9/1971 | Panigati . |
| 3,678,809 | 7/1972 | Doutt . |
| 3,901,416 | 8/1975 | Schultz . |
| 3,913,460 | 10/1975 | Wright . |
| 4,075,935 | 2/1978 | Panigati . |
| 4,283,064 | 8/1981 | Staab et al. .................... 277/152 X |

FOREIGN PATENT DOCUMENTS

| | | | |
|---|---|---|---|
| 677/26 | of 1926 | Australia ............................. 277/174 |
| 1047641 | 12/1958 | Fed. Rep. of Germany ........ 92/242 |
| 447951 | 11/1912 | France .................................. 92/244 |
| 1021966 | 12/1952 | France ................................. 277/152 |
| 478321 | 1/1938 | United Kingdom . |
| 492954 | 9/1938 | United Kingdom ................ 277/152 |
| 602746 | 6/1948 | United Kingdom ................ 277/152 |
| 2077371A | 12/1981 | United Kingdom . |
| 2105797A | 3/1983 | United Kingdom . |

Primary Examiner—Robert S. Ward
Attorney, Agent, or Firm—Morgan, Finnegan, Pine, Foley & Lee

[57] ABSTRACT

A one-piece, self-lubricating, thermoplastic sealing member suitable for a single action piston pump, the sealing member comprising a tubular shaped body, a peripheral portion of which is radially cut into two flanges of preselected length and thickness. One of the flanges has a shorter radial length and a thinner width than the other flange. The flanges are substantially in registry with one another and are bent, preferably in the vicinity of their respective bases, in the same direction to a preselected angle below 20° relative to a transverse axis of the sealing member. When the sealing member is disposed in an annular space between the piston and the cylinder, the double flange portions of the sealing member are in contact with the annular surface of the cylinder or alternately, with a fixed or moveable shaft, providing two sealing engagements therebetween in seriatim, and the oppositely disposed peripheral portion of the sealing member is secured in the piston, or alternately, in the cylinder.

18 Claims, 7 Drawing Figures

DOUBLE FLANGE SEALING MEMBER FOR SINGLE ACTION PISTON PUMP

BACKGROUND OF THE INVENTION

1. Field of the Invention

This invention relates to seals for single action piston pumps of both high and low pressure types.

2. Description of the Prior Art

Various sealing means, including resilient sealing members positioned annularly about pistons moveable in cylinders are known. Examples of sealing means are disclosed in U.S. Pat. Nos. 2,310,971; 2,684,632; 3,136,228; 3,391,465; 3,487,897; 3,678,809; 3,913,460; and 4,075,935.

SUMMARY OF THE INVENTION

Objects of the Invention

It is an object of this invention to provide a sealing member having two radially extending flanges whose peripheral annular surface defines two separate and discrete sealing surfaces suitable for use in hydraulic and/or pneumatic piston and cylinder assemblies.

An object of this invention is to provide a one-piece, thermoplastic sealing member which is self-lubricating in use and which maintains an effective seal with minimum frictional drag between the sealing member and an annular surface moving relative thereto or relative to which the seal moves.

An object of this invention is to provide a thermoplastic sealing member which is durable and has two radially extending, resilient flange portions which self-adjust to maintain a sealing engagement between a piston and a cylinder while compensating for such wear as does occur.

An object of this invention is to provide a thermoplastic sealing member having two radially extending, resilient flange portions which can be bent, in the vicinity of their respective bases, under pressure from an initial position to form a preselected angle with a transverse axis of the sealing member.

Other objects and advantages of the invention will become apparent from the following description of preferred embodiments thereof read in conjunction with the accompanying drawings in which like parts bear like reference numerals.

DETAILED DESCRIPTION OF THE INVENTION

Figure 1:
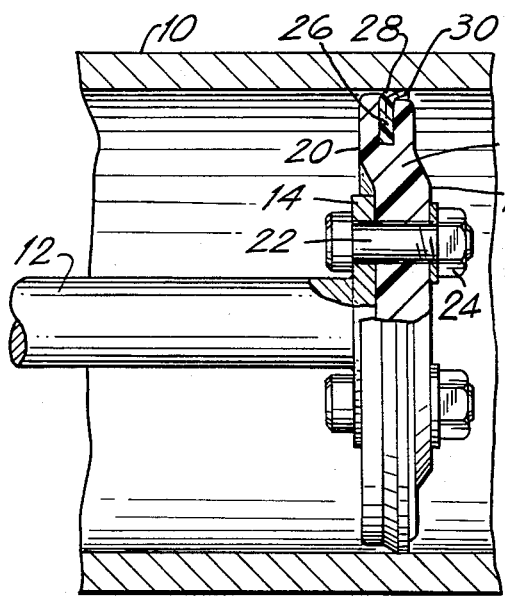
FIG. 1 is an elevational view partly in section of a sealing member embodying the invention shown in association with a portion of a piston and hydraulic cylinder assembly.

By referring to the drawings and FIGS. 1, 1A, 2 and 4 in particular, it will be seen that a hydraulic or pneumatic cylinder 10 is shown with a typical piston assembly therein and coaxially aligned therewith for reciprocating movement along the longitudinal axis thereof. The piston assembly comprises a piston rod 12 having a flange portion 14 radially extending therefrom, and a piston follower 16 having a blind side 18 and a piston rod side 20. A threaded pin 22, extending through holes in the flange portion 14 and the follower 16, and secured by a nut 24 engaged thereon, secures the follower 16 to the flange portion 14 of the piston rod 12. The follower 16 also may be held by a single control nut (not shown).

Figure 1A:
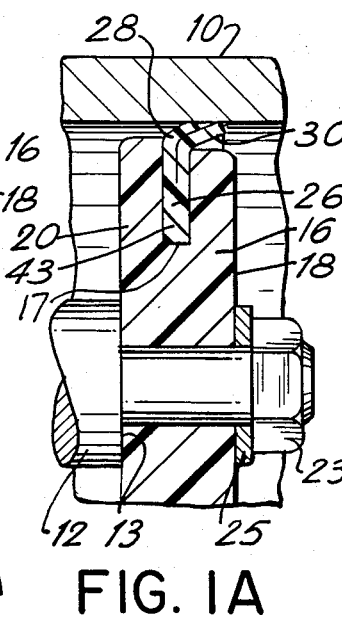
FIG. 1A is an enlarged view of the sealing member and piston and cylinder assembly of FIG. 1.

The follower 16 is so formed that there are predetermined clearances between the annular peripheral surfaces on its blind side 18 and piston rod side 20, and the annular inner surface of the cylinder 10. The clearance between the blind side 18 of the follower 16 and the annular inner surface of the cylinder 10 is dimensioned so as to permit predetermined deflections of flanges 28 and 30 when the flanges 28 and 30 are in situ, as discussed hereinafter. This is accomplished by making the diameter of the blind side 18 smaller than the piston rod side 20 of the follower 16 (FIGS. 1 and 1A). The clearance between the piston rod side 20 of the follower 16 and the annular inner surface of the cylinder 10 is dimensioned so as to prevent reverse deformation and blowback of the flanges 28 and 30 when the flanges 28 and 30 are in situ, during operation of the piston and cylinder assembly. This is accomplished by making the diameter of the piston rod side 20 larger than the blind side 18 of the follower 16 (FIGS. 1 and 1A).

Follower 16 may be formed of any thermoplastic or thermosetting resin which will remain relatively rigid under the operating temperatures and pressures of the piston and cylinder assembly and which is capable of being molded in a fashion to partially encapsulate and retain a plastic sealing member such as a polytetrafluoroethylene (PTFE) sealing member. Suitable materials for the follower 16 include epoxy resins, polyesters, polycarbonates, polyetherimides and the like. As shown in FIG. 1, follower 16 is a one-piece thermoplastic or thermosetting material which may be formed by molding to the desired shape.

A peripheral portion of the sealing member 26 is secured to the middle peripheral area of the follower 16 using well known molding practices. The sealing member 26 typically is mounted in a mold and a thermoplastic or thermosetting resin is molded around it. The sealing member may be treated by an etching process in the area where it will be contacted by the molding resin to promote a bond. Holes also may be provided in the sealing member, if desired, to permit the molding resin to flow through and create a positive lock. However, encapsulation of the sealing member in the molding resin has been found to be sufficient. Partial encapsulation of the sealing member 26 in the follower 16 results in a one piece part that is not only more economical to manufacture but also eliminates the problem associated with the mechanical assembly of multiple parts, i.e., the problem of mounting the sealing lips in registry with the center line to maintain efficiency of the unit.

The oppositely disposed peripheral portion of the sealing member 26 is divided into two radially extending flanges 28 and 30, respectively. The flanges 28 and 30 have a preselected length and thickness. Flange 28 is formed so that it has a shorter radial length and thinner width than flange 30.

Figure 3:
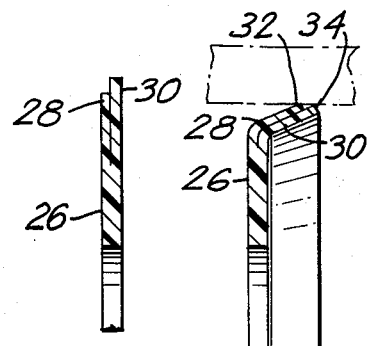
FIG. 3 is a cross-section taken on the line 3—3 of FIG. 2 of an embodiment of the sealing member prior to deflection of its sealing surfaces from an initial position.

As shown in FIG. 3, the flanges 28 and 30 are initially radially aligned with the transverse axis of the sealing member 26. Then, the flanges 28 and 30 are deformed by application of heat and pressure or pressure alone, i.e., bent, preferably at or in the vicinity of their respective bases, so that their respective lengths form a first preselected angle below about 20°, generally between about 2° and 20°, preferably between about 3° and 11°, and more preferably between 5° and 9°, relative to a transverse axis of the sealing member 26. The resiliency of the flanges permits them to be further bent to facilitate installation of the piston assembly in the cylinder, upon application of pressure.

Flanges 28 and 30 not only are resilient, but they have a memory which urges them to return to their initial prebent position. When being positioned between the piston and the cylinder, peripheral annular surfaces 32 and 34 of flanges 28 and 30, respectively, are placed into sealing engagement with the inner surface of the cylinder 10. When positioned in situ between the piston and the cylinder (FIG. 4), the memory of flanges 28 and 30 causes their peripheral annular surfaces 32 and 34 to be urged radially against the inner surface of the cylinder 10 so as to continuously compensate for any irregularities of the inner surface of the cylinder 10 and maintain the sealing engagement therebetween. As indicated previously herein, the annular clearances between the blind side 18 and piston rod side 20 of the follower 16 and the annular inner surface of the cylinder 10 are preselected so as to permit deflection of the flanges 28 and 30 when placed in sealing engagement with the inner surface of the cylinder 10 and also so as to prevent reverse deformation and blowback of the flanges 28 and 30 during operation of the piston and cylinder assembly.

Figure 6:
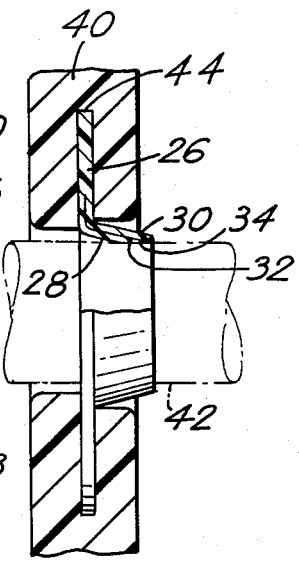
FIG. 6 is a cross-section taken on the line 6—6 of FIG. 5 of an embodiment of the sealing member of the invention attached to a cylinder, and also positioned in the annular space between a shaft and the cylinder. In this embodiment, the two resilient flange portions of the sealing member are on the inside diameter of the sealing member, and when positioned between the shaft and the cylinder, the resilient flange portions are deflected to contact and seal on the shaft.
Figure 2:
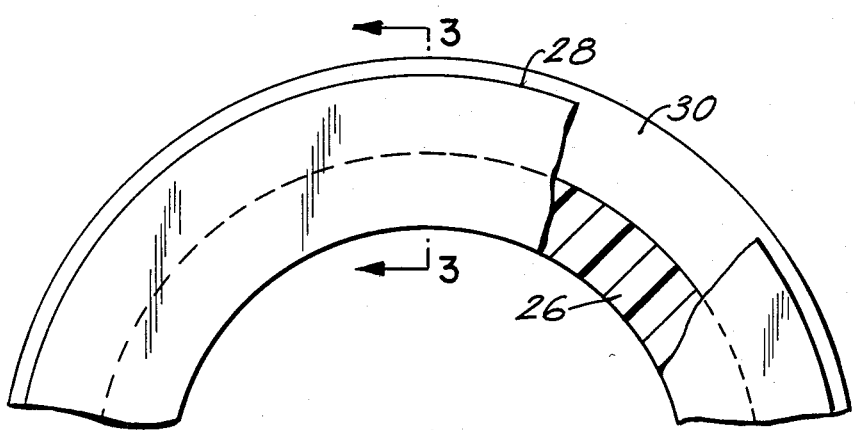
FIG. 2 is a plan view of the sealing member of FIG. 1.

During the initial break-in period of use, it has been found that the peripheral annular surfaces 32 and 34 deposit a coating of their thermoplastic material less than about 5 microns in thickness onto the mating annular inner surface of the cylinder 10 (FIGS. 1, 1A and 4) or the shaft 42 (FIG. 6). Such deposit provides a seal between surfaces comprised of the same thermoplastic material and assures that there is little or virtually no wear of flanges 28 and 30, particularly when the thermoplastic materials contemplated for this invention are employed.

The sealing member 26 is made of a fluoroplastic such as polytetrafluoroethylene (PTFE); or PTFE containing a wear resistant filler such as polyimide, glass fibers, bronze, carbon, graphite or the like. Particularly preferred is a virgin PTFE or the PTFE disclosed in U.S. Pat. No. 3,652,409. Other suitable fluoroplastics include a perfluoroalkoxy resin having the following repeating units:

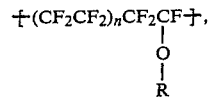

wherein R is $C_nF_{2n+1}$ and n is an integer $\geq 1$; a fluorinated ethylenepropylene (FEP) having the following repeating units:

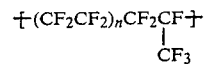

wherein R is an integer 1(melting point of about 310° C.); ethylene-chlorotrifluoroethylene copolymer (ECTFE) (melting point of about 245° C. and a density of 1.68 g/cc. which is predominantly 1:1 alternating copolymer product of copoymerizing ethylene and chlorotrifluoroethylene and consisting of linear chains with the predominate repeating units:

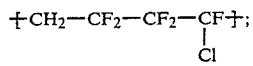

ethylene-tetrafluoroethylene copolymer (melting point of about 270° C. and a density of 1.70 g/cc) which is predominantly 1:1 alternating copolymer of ethylene and tetrafluoroethylene and consisting of linear chains with the repeating unit $CH_2-CH_2-CF_2-CF_2$; and polyvinylidene fluoride (melting point of 170° C. and a density of 1.78 g/cc.)

PTFE and PTFE containing one or more wear-resistant fillers are preferred materials because of their low frictional properties, their memory, in their chemical inertness, and their thermal properties. The following discussion concerning the manufacture of the sealing member of this invention refers to PTFE for illustrative purposes. A PTFE material is molded or machined into an annular tube-like shape having a wall thickness substantially equal to the radial length of the sealing member to be formed. The wall thickness is sufficient to provide sealing lips or flanges 28 and 30 and a mounting surface 43 held within an annular groove 17 in the piston follower 16 (FIGS. 1 and 1A) or within an annular groove 43 in the cylinder 10 (FIG. 6). A radial slice is made in the outer circumference of the tube wall to a preselected depth sufficient to define the length of the two flanges of the sealing member. The radial slice in the tube wall is made so that two flanges of unequal thickness and equal length are formed initially. The end of the thinner flange 28 is turned down or removed to shorten its radial length. The thicker flange 30 then extends radially outward beyond the thinner flange 28.

When the sealing member 26 is to be used in the outer surface of a piston as a seal between the piston and the inner surface of a cylinder (FIGS. 2, 3 and 4), the radial slicing of the tube-like sealing member and shortening of the thinner flange is done on the outer circumference of the tube.

Figure 5:
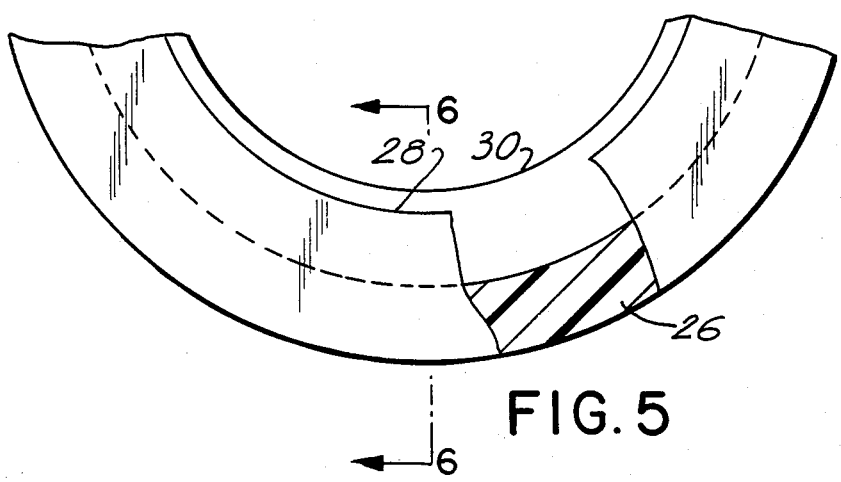
FIG. 5 is a plan view of an embodiment of the sealing member of FIG. 6.
Figure 4:
FIG. 4 is a cross-section taken on the line 3—3 of FIG. 2 of an embodiment of the sealing member of the invention attached to a piston, and positioned in the annular space between the piston and a cylinder.

When the sealing member 26 is to be used as a seal in a cylinder 40 around a shaft 42 (FIG. 6), the radial slicing of the tube wall of the sealing member and shortening of the thinner flange is done on the inner circumference of the tube wall (FIG. 5). The solid or uncut outer circumferential portion of the sealing member 26 is secured any way that provides a leak free joint, e.g., by mold bonding, adhesive bonding, clamping, etc., within an annular groove 44 of the cylinder 40 when the seal is to be made between cylinder 40 and shaft 42. The sliced flanges 28 and 30 extend radially inwardly from the sealing member 16. The radially inwardly extended sliced flanges 28 and 30 are deflected and formed as described hereinabove, to provide a sealing engagement about the shaft.

The thicker (and hence heavier) flange 30 at the blind side 18 of the follower 16 permits longer wear of the sealing member 26 while the thinner flange 28, at the piston side 20 of the follower 16, is most flexible and allows better conformance of the seal to the inner surface of the cylinder. The thinner flange 28 conforms to the interior surface of the cylinder 10 more precisely at pressures of up to about 15 psi than the thicker flange 30. The thicker flange 30 becomes more effective at pressures above 15 psi.

The nature of both resilient flanges 28 and 30 is to serve a a wiper blade for the other and remove any debris or liquid that might be present on the interior surface of the cylinder 10 as the piston moves axially with respect to the cylinder 10 (FIGS. 1, 1A, and 4), or on the exterior surface of the shaft 42 as the shaft 42 moves axially and/or rotates in relation to the flanges 28 and 30.

It will be apparent to those skilled in that art that various changes, modifications and uses of the present invention are possible without departing from the spirit of the invention or the scope of the appended claims in light of the above teachings.

What is claimed is:

1. A one-piece, self-lubricating, thermoplastic sealing member suitable for mounting on a piston located within a piston and cylinder assembly that operates under differential pressure, said piston and cylinder capable of moving axially relative to one another, said sealing member comprised of an annular shaped body, a peripheral wall portion of which is radially cut into two flexible and resilient flanges of preselected length and thickness, said flanges being substantially in registry with one another, in radial alignment with a transverse axis of said sealing member in an initial position and can be bent in the vicinity of their respective bases in the same direction from said initial position to a preselected angle below about 20° relative to said transverse axis of said sealing member, said flanges having a memory which urges them to return to their initial prebent position, said sealing member adapted for disposition in an annular space between said piston and said cylinder so that: (1) the peripheral positions of said flanges are placed in continuous contact under tension with the annular surface of the inner walls of said cylinder, providing two discrete sealing engagements therebetween in seriatim, the memory of said flanges causing their peripheral portions to be urged radially against the annular surface of the inner walls of said cylinder so as to continuously compensate for any irregularities of the annular surface of the inner walls of said cylinder and maintain said sealing engagements during axial movement of the piston with respect to the cylinder, and (2) the peripheral portion of said sealing member which is oppositely disposed to said flanges is fixedly secured in said piston.

2. A sealing member as defined in claim 1 wherein a first one of said flanges is longer and thicker than the other flange.

3. A sealing member as defined in claim 1 wherein said peripheral portion of said sealing member which is oppositely disposed to said flanges is fixedly secured within an annular groove in said piston.

4. A sealing member as defined in claim 1 wherein said peripheral portion of said sealing member which is oppositely disposed to said flanges is mold bonded in said piston.

5. A sealing as defined in claim 1 having a tubular shaped body.

6. A sealing member as defined in claim 1 wherein said thermoplastic is a fluoroplastic selected from the group consisting of polytetrafluoroethylene containing up to 60 percent by weight of a wear resistant filler selected from polyimide, glass fibers, bronze, carbon, and graphite; a perfluoroalkoxy resin having the following repeating units:

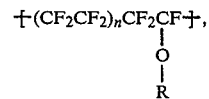

wherein R is $C_nF_{2n+1}$ and n is an integer 1; a fluorinated ethylenepropylene having the following repeating units:

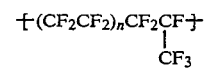

wherein R is an integer $\leq 1$; ethylene-chlorotrifluoroethylene copolymer, ethylene-tetrafluoroethylene copolymer; and polyvinylidene fluoride.

7. A sealing member as defined in claim 6 wherein said thermoplastic is polytetrafluoroethylene containing up to 60 percent by weight of a wear resistant filler selected from polyimide, glass fibers, bronze, carbon or graphite.

8. A sealing member as defined in claim 1 wherein said preselected angle is between about 3° and 11°.

9. A sealing member as defined in claim 2 wherein said thermoplastic is polytetrafluoroethylene containing up to 60 percent by weight of a wear resistant filler selected from polyimide, glass fibers, bronze, carbon and graphite; and wherein said preselected angle is between about 3° and about 11°.

10. A sealing member as defined in claim 8 wherein said preselected angle is between about 5° and about 9°.

11. A one-piece, self-lubricating, thermoplastic sealing member suitable for mounting in an inner wall of a cylinder located within a cylinder assembly that operates under a differential pressure, a moveable shaft being located within said cylinder assembly, said sealing member comprised of an annular shaped body, an inner wall portion of which is radially cut into two flexible and resilient flanges of preselected length and thickness, said flanges being substantially in registry with one another, in radial alignment with a transverse axis of said sealing member in an initial position, and can be bent in the vicinity of their respective bases in the same direction from said initial position to a preselected angle below about 20° relative to said transverse axis of the sealing number, said flanges having a memory which urges them to return to their initial prebent position, said sealing member adapted for disposition in an annular space between said moveable shaft and the cylinder assembly so that: (1) a peripheral wall portion of the sealing member is fixedly secured within said cylinder assembly, and (2) the peripheral portions of said flanges are placed in continuous contact under tension with the annular outer surface of said shaft, providing two discrete sealing engagements therebetween in seriatim, the memory of said flanges causing their peripheral portions to be urged radially against the annular outer surface of said shaft so as to continuously compensate for any irregularities in the annular outer surface of said shaft and maintain said sealing engagements during axial and/or rotational movement of the shaft with respect to the cylinder.

12. A sealing member as defined in claim 11 wherein a first one of said flanges is longer and thicker than the other flange.

13. A sealing member as defined in claim 11 having a tubular shaped body.

14. A sealing member as defined in claim 11 wherein said thermoplastic is a fluoroplastic selected from the group consisting of polytetrafluoroethylene containing up to 60 percent by weight of a wear resistant filler; a perfluoroalkoxy resin having the following repeating units:

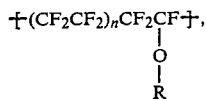

wherein R is $C_nF_{2n+1}$ and n is integer $\leq 1$; a fluorinated ethylenepropylene having the following repeating units:

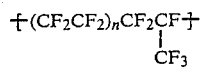

wherein R is an integer $\leq 1$; ethylene-chlorotrifluoroethylene copolymer, ethylene-tetrafluoroethylene copolymer; and polyvinylidene fluoride.

15. A sealing member as defined in claim 14 wherein said thermoplastic is polytetrafluoroethylene containing up to 60 percent by weight of a wear resistant filler selected from polyimide, glass fibers, bronze, carbon or graphite.

16. A sealing member as defined in claim 11 wherein said preselected angle is between about 3° and 11°.

17. A sealing member as defined in claim 16 wherein said thermoplastic is polytetrafluoroethylene containing up to 60 percent by weight of a wear resistant filler selected from polyimide, glass fibers, bronze, carbon and graphite; and wherein said preselected angle is between about 3° and about 11°.

18. A sealing member as defined in claim 16 wherein said preselected angle is between about 5° and about 9°.

* * * * *